Patented Aug. 7, 1934

1,969,444

UNITED STATES PATENT OFFICE 1,969,444

DIBENZOTHIOCARBOCYANINE DYE AND PROCESS OF PREPARING IT

Leslie G. S. Brooker, Rochester, N. Y., assignor to Eastman Kodak Company, Rochester, N. Y., a corporation of New York No Drawing. Application March 12, 1930, Serial No. 435,105

25 Claims. (Cl. 260—44)

This invention relates to a new composition of matter, and particularly to a new class of photographic sensitizing dyes and methods for their preparation.

This application is in part a continuation of my co-pending application Serial Number 337,177, in which I have described naphthalene substituted cyanine dyes of the thiocarbocyanine series, namely, cyanine dyes of the thiocarbocyanine series which contain two naphthothiazole nuclei and a method for their preparation. These dyes are particularly well adapted for incorporation in photographic emulsions in order to render those emulsions more sensitive to particular portions of the spectrum. It has been known for some time, in the photographic art, that in order to render photographic emulsions sensitive to substantially all the visible rays of the spectrum, it is necessary to treat the emulsions, either by overcoating or by admixture with the emulsion itself, with a compound which extends the sensitivity of the emulsion beyond its natural sensitivity. An untreated emulsion will generally record only the short waves such as the blue and violet. By the proper use of a suitable dye, this restricted sensitivity can be varied at will, within certain limits. For example, the emulsion can be rendered strongly sensitive to green or blue or to any of the other visible bands of the spectrum, or it can be rendered sensitive to all the visible rays in substantially equal degrees.

The object of the present invention is to provide a process for the preparation of light sensitive emulsions, the sensitivity of whch is augmented over certain bands of the spectrum. Another object of this invention is to provide a process for the preparation of dyes which may be incorporated in, or coated upon, photographic gelatino-silver-halide emulsions in order to increase their color sensitivity. A further object of this invention is to describe various methods for the preparation of such dyes. Other objects will hereinafter appear.

I have found that cyanine dyes, such as the thio-iso-cyanines, the thio-pseudo-cyanines, which are also called the thio-ψ-cyanines, as well as dyes of the thiocarbocyanine series containing a naphthothiazole nucleus which includes such dyes as 8-methyl-2:2′ diethyl 3:4:4′:4′ dibenzo-thiocarbocyanine bromide and 2:2′ diethyl-3:4:3′:4′-dibenzo-thiocarbocyanine bromide and others which may be included under the broad classifications of the thio-iso and thio-pseudo-cyanine dyes described above, may be prepared from the intermediates mu methyl naphthothiazoles. These dyes, when prepared in the manner described herein, together with the substitution products of these dyes are especially useful for addition directly to the gelatino-silver-halide or other photographic emulsions which may subsequently be coated on plates, films or other materials. Furthermore, these dyes are useful as overcoatings for photographic light sensitive surfaces, thereby increasing the light sensitivity of those surfaces.

I will now explain the method for the production of a particular class of these dyes, but it will be understood that I am not to be restricted by the definite proportions or exact ingredients therein given except as they may be so indicated by the claims appended hereto. It will likewise be understood that the chemical structural formulæ employed herein are theoretical and are given so that those skilled in the art may more readily understand the composition of these dyes. Whether or not the chemical structures given are correct will in no way limit the scope of this invention as the method for the preparation of the dyes, together with the suggested equivalents that may be used in such preparations will enable the skilled organic chemist to prepare these dyes, whatever their theoretical structural formulæ may be.

Example 1

In the preparation of 2.2′ diethyl 5:6:5′:6′ dibenzo-thiocarbocyanine bromide one member of a large number of dyes that would come under the series given above I first prepare from beta naphthylamine, 1-methyl alpha naphtho-thiozole by known prescribed academic methods. This intermediate has the following structural formula:

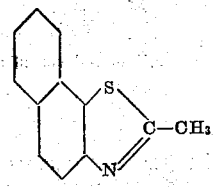

Step A.—One molecular proportion of 1-methyl alpha naphthothiazole is condensed with one molecular proportion of ethyl-p-toluene sulfonate by heating the substances together at 100° C. for six hours.

Step B.—The resulting crude product is dissolved in boiling dry pyridine, two molecular equivalents of ethyl ortho formate added and the whole refluxed for two hours.

*Step C.*—The dye is precipitated from the pyridine solution as the bromide by using aqueous ammonium bromide and crystallized from methyl alcohol in which it gives a purplish-blue solution. The bromide crystallizes in greenish-brown needles. The several reactions are believed to be as follows:

Step A

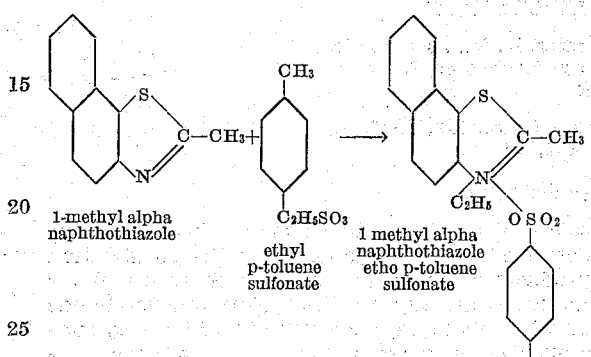

1-methyl alpha naphthothiazole  ethyl p-toluene sulfonate  1 methyl alpha naphthothiazole etho p-toluene sulfonate Step B

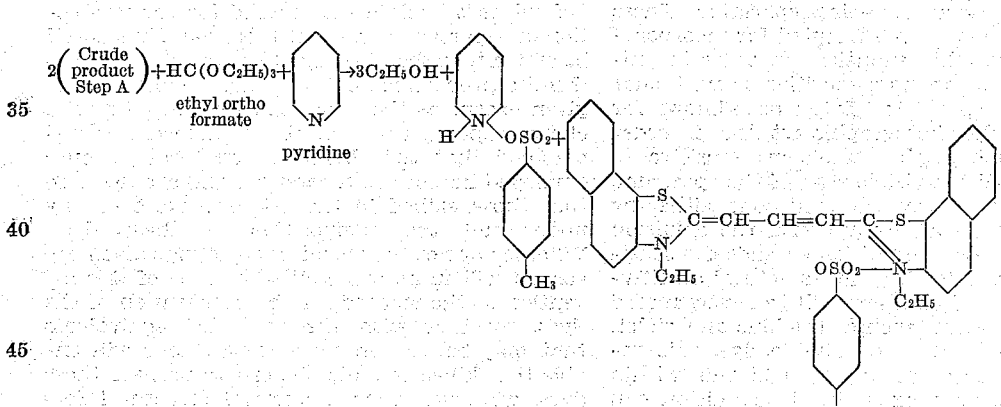

ethyl ortho formate  pyridine

Step C

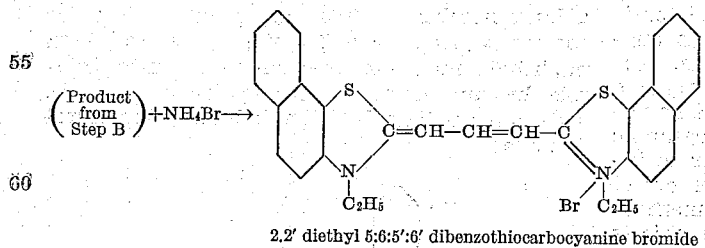

2.2′ diethyl 5:6:5′:6′ dibenzothiocarbocyanine bromide

They are carbocyanines because of the existence therein of the tri-methenyl chain—CH=CH—CH= (a chain having the conjugate type of linkage), the name being first adopted by Mills and Pope in their article entitled "The carbocyanines"—page 253 of The Photographic Journal, November 1920, bottom of pages 254 and 265 being the pertinent portions; they are thiocarbocyanines because of the sulfur in the thiazole nucleus.

*Example 2*

One gram of 1-methyl alpha naphthothiazole is heated with one gram of allyl iodide under reflux on a steam bath. The initial reaction is rapid and heating is continued for a further 2½ hours. The product is crystallized from methyl alcohol and washed with acetone. A yield of approximately 1.8 grams is obtained. The 1-methyl alpha naphthothiazolealliodide iodide is treated in 20 c. c. of boiling dry pyridine with 1.5 c. c. of ethyl ortho formate and boiled under reflux for 2 hours. On cooling most of the dye separates out, is filtered off and crystallized from methyl alcohol when it is obtained in beautiful green needles. This dye is named 2:2′ diallyl 5.6.5′:6′ dibenzo-thiocarbocyanine iodide.

*Example 3*

In the preparation of 1′:2 diethyl 5:6 benzothio-isocyanine iodide one molecular proportion of 1-methyl alpha naphthothiazole is condensed with one molecular proportion of ethyl-p-toluene sulfonate by heating the substances together at 100° C. for approximately 6 hours. The resulting crude product, which comprises substantially 1-methyl alpha naphthothiazoleetho-p-toluene sulfonate is condensed with one molecular proportion of quinoline ethiodide using one molecular proportion of potassium hydroxide, the reaction being carried out in boiling absolute ethyl alcohol. This mixture is refluxed for 15 minutes. Upon cooling the dye separates and may be recrystallized from methyl alcohol. The resulting dye obtained consists of scarlet needles which impart to a methyl alcohol solution a crimson red coloration. The several reactions involved are believed to be as follows:

Step A

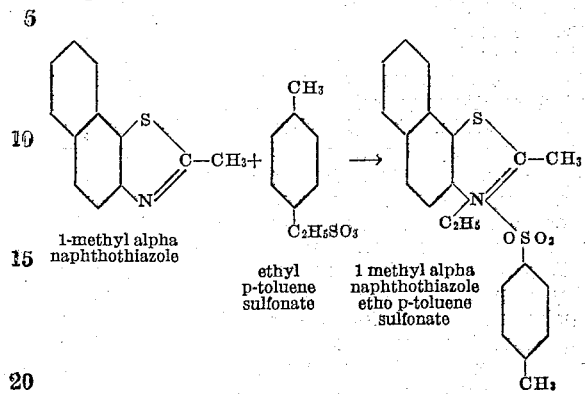

Step B

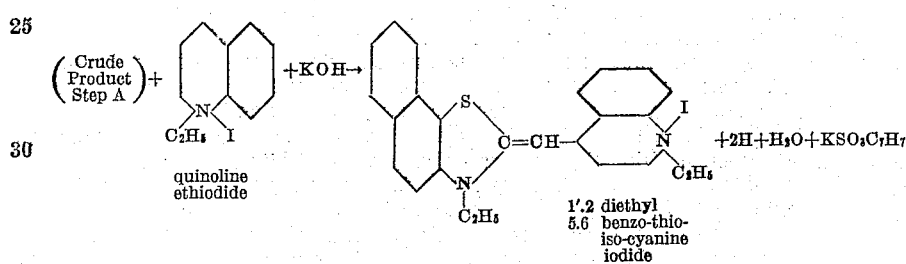

riod of from five to ten minutes. The several reactions involved are believed to be as follows:

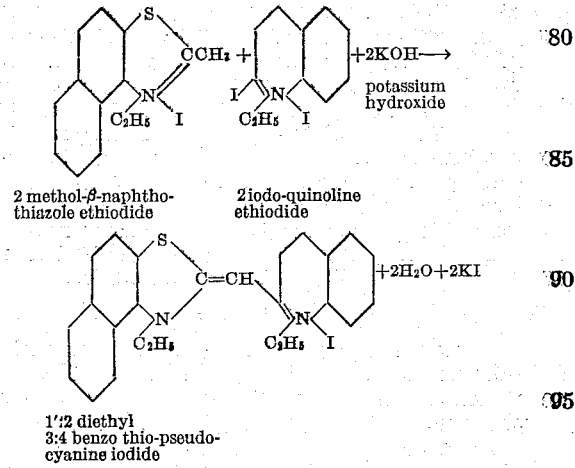

Example 4

If an equivalent amount of 2-methyl beta naphthothiazoleethiodide be used in place of the 1-methyl alpha naphthothiazoleetho-p-toluene sulfonate used in Example 3, a product will be obtained consisting of brown needles with a brassy-green reflex. This dye will give a crimson solution in methyl alcohol, and it may be called 1':2 diethyl 3:4 benzo-thio-iso-cyanine iodide.

Example 5

1':2-diethyl-3:4-benzothio-pseudo-cyanine iodide may be prepared from 2-methyl beta naphthothiazole ethiodide by the following process. The intermediate is obtained by heating equimolecular proportions of 2-methyl beta naphthothiazole and ethyl-p-toluene sulfonate together at a temperature of 130 to 140° C. in an oil bath for a period of approximately one week. When this salt is to be used it is purified by extracting the unchanged starting material with acetone, in which the 2-methyl beta naphthothiazole etho-p-toluene sulfonate is sparingly soluble. This salt may be converted into the iodide by double decomposition in fairly concentrated aqueous solutions with potassium iodide, whereby 2-methyl beta naphthothiazole ethiodide is obtained. This substance is crystallized from methyl alcohol and dried at an elevated temperature and is ready for use. 9.5 g. (1 mol.) of this material is suspended in 80 c. c. of absolute ethyl alcohol together with 11 g. (1 mol.) of 2-iodoquinoline ethiodide. To this solution is added with constant vigorous shaking 3.6 g. (2 mol.) of potassium hydroxide of about 85% purity dissolved in absolute ethyl alcohol, the alkali being added to the boiling alcoholic solution gradually during a period of from five to ten minutes. The boiling is continued for a period of 15 minutes after all the alkali has been added. The dye is filtered from the cooled solution and is purified by washing with boiling water and then with cold water followed by acetone. The dye crystallizes from methyl alcohol in light brown plates and gives a pinkish-orange solution in methyl alcohol.

Example 6

If in Example 5, 1-methyl alpha naphthothiazole ethiodide is used in place of 2-methyl beta naphthothiazole ethiodide 1'.2 diethyl 5.6 benzothio-pseudo-cyanine iodide is produced. This dye crystallizes in light brown crystals which give a pinkish orange colored solution when dissolved in methyl alcohol.

Example 7

10 g. (1 mol.) of 2-methyl beta naphthothiazole etho-p-toluene sulfonate, prepared as described above, is boiled under reflux in 25 c. c. of dry pyridine with 8.1 g. (2 mols.) of triethyl ortho acetate for approximately 1½ hours. An excess of ammonium bromide in hot water is then added and the whole allowed to cool and the product is filtered off and washed. Green crystals of 8-methyl 2.2' diethyl 3.4.3'.4' dibenzothiocarbocyanine bromide are obtained on crystallizing the dye from methyl alcohol. The reaction involved is similar to that described in connection with Example 1 except that 2-methyl-beta- instead of 1-methyl-alpha-naphthothiazole and ethyl ortho acetate instead of ethyl ortho formate are employed.

Example 8

8 grams (1 mol.) of 2-methyl beta naphthothiazole etho-p-toluene sulfonate, 5.4 grams (2 mol.)

of trimethyl-ortho-propionate are refluxed with 35 cc. of dry pyridine for approximately one hour. A hot aqueous solution of potassium iodide is added. After allowing this solution to cool the precipitate is filtered out. The product is digested in hot acetone and again filtered. The dye is then boiled with successive portions of water until free from the ethiodide of the base. The crude dye obtained in one reaction weighed .36 grams and consisted of a purplish-black powder. Upon crystallization from methyl alcohol minute dark green crystals of the dye were obtained which give a purplish solution in this solvent. This dye is called 2.2'.8-triethyl 3.4.3'.4' dibenzothiocarbocyanine iodide.

Example 9

7.7 grams (1 mol.) of 2-methyl beta naphthothiazole metho-p-toluene sulfonate, 8.2 grams (2 mol.) of methyl-diethyl-ortho-iso-caproate are refluxed for about 45 minutes in 40 cc. of dry pyridine. To the resultant solution 10 grams of potassium iodide dissolved in 50 cc. of hot water is added to precipitate the dye and after standing for about 10 to 12 hours is filtered, washed with boiling water and then warm acetone to remove the impurities. The product weighs 1.5 grams and is an olive green color. Upon crystallization from methyl alcohol green felted needles are produced. This dye is called 2.2' dimethyl 8 iso-amyl 3.4.3'.4' dibenzo thiocarbocyanine iodide.

The foregoing examples are sufficient to teach the principles of my invention but if further examples of compounds and methods of preparing them included in the scope of my invention are desired they may be found in my co-pending applications; for instance, the dibenzo thiocarbocyanines in my application Serial No. 337,177 filed February 2, 1929, the 8-substituted dibenzo thiocarbocyanines in my application Serial No. 435,104, filed March 12, 1930 and the benzo-thio-iso and benzothio-pseudo cyanines in my application Serial No. 437,017 made of record on March 12, 1930 and given a filing date on March 19, 1930.

From a consideration of the above numerous examples for preparing various photo sensitizing dyes from mu methyl naphthothiazoles as intermediates, it will be readily realized that the 1-methyl alpha or the 2-methyl beta naphthothiazole which may be generically called mu methyl naphthothiazoles may be used in the preparation of numerous types of photo sensitizing dyes. It will be realized, therefore, that after preparing the alkyl quaternary salt such as the methiodide or ethiodide or the etho-p-toluene sulfonate from the mu methyl naphthothiazole, the particular dye it is desired to obtain may be produced either by condensing the aforementioned quaternary salt with a quaternary salt derived from quinoline or by the condensation of two naphthothiazole nuclei effected with the aid of ethyl ortho formate, ethyl ortho propionate or other esterified ortho carboxylic acids. Any suitable acid radical (as described in this and my co-pending applications) may be used to precipitate the dye, for example, a halide, p-toluene sulfonate, or alkylo sulfate or, in fact, any suitable acid radical which will not greatly decrease or destroy the sensitizing properties of the dye, this radical being necessary to give electrical neutrality to the molecule. In the claims the phrase—"a suitable acid radical"—is employed to designate this group of acid radicals. It will be noted that when the alkyl ortho acid esters are employed, the condensation of two molecules of the mu methyl naphthothiazole alkyl quaternary salt is effected, while if a second quaternary salt is to be condensed with the methyl naphthothiazole the reaction can be effected in boiling ethyl alcohol in the presence of a caustic alkali. In either case, the reaction is a condensation of two alkyl quaternary salts. To avoid confusion it may be stated that in this application and in co-pending applications an excess of one reagent or another may be indicated or employed; this, however, does not alter the reaction as stated broadly above and elsewhere in this application or co-pending applications.

It will be readily realized from a study of this application, together with my co-pending applications on various classes of photo sensitizing dyes that numerous substituted quinolines may be employed as well as the substituted mu methyl naphthothiazoles without departing from the scope of this invention or sacrificing any of the beneficial results obtained from the dyes when used as photo sensitizers or for other purposes.

The thio-iso-cyanine and the thio-pseudo-cyanine dyes and the process of making them disclosed above are described and claimed in my co-pending application entitled "Cyanine dyes and process of preparing them".

What I claim as new and desire to secure by Letters Patent of the United States is:

1. A process for the preparation of cyanine dyes which comprises condensing two molecular proportions of a mu-methyl-naphthothiazole alkyl quaternary salt, except the 2-methyl-β-naphthothiazole alkyl iodides, with one molecular proportion of an orthoester of an aliphatic monobasic carboxylic acid in the presence of an organic base which is a solvent for the reactants and which acts to bind acid eliminated from the quaternary salt as a result of the condensation.

2. A process for the preparation of cyanine dyes which comprises condensing two molecular proportions of a mu-methyl-naphthothiazole alkyl quaternary salt with one molecular proportion of ethyl ortho formate in the presence of an organic base which is a solvent for the reactants and which acts to bind acid eliminated from the quaternary salt as a result of the condensation.

3. A process for the preparation of cyanine dyes which comprises condensing two molecular proportions of a mu-methyl-naphthothiazole alkyl quaternary salt, except the 2-methyl-β-naphthothiazole alkyl iodides, with an ortho ester of an aliphatic monobasic carboxylic acid in the presence of pyridine.

4. A process for the preparation of cyanine dyes which comprises condensing two molecular proportions of a mu-methyl-naphthothiazole alkyl quaternary salt with one molecular proportion of ethyl ortho formate in the presence of pyridine.

5. A process for the preparation of cyanine dyes which comprises condensing two molecular proportions of a mu-methyl naphthothiazole alkyl quaternary salt, except the 2-methyl-β-naphthothiazole alkyl iodides, with one molecular proportion of an ortho ester of an aliphatic monobasic carboxylic acid other than formic acid in the presence of an organic base which is a solvent for the reactants and which acts to bind acid eliminated from the quaternary salt as a result of the condensation.

6. A process for the preparation of cyanine dyes which comprises condensing two molecular proportions of a 2-methyl-beta-naphthothiazole alkyl quaternary salt, except the iodides, with one molecular proportion of an ortho ester of an aliphatic monobasic carboxylic acid in the presence of an organic base which is a solvent for the reactants and which acts to bind acid eliminated from the quaternary salt as a result of the condensation.

7. A process for the preparation of cyanine dyes which comprises condensing two molecular proportions of a 2-methyl-beta-naphthothiazole alkyl quaternary salt, except the iodides, with one molecular proportion of ethyl-ortho-acetate in the presence of an organic base which is a solvent for the reactants and which acts to bind acid eliminated from the quaternary salt as a result of the condensation.

8. A process for the preparation of cyanine dyes which comprises condensing two molecular proportions of a 2-methyl-beta-naphthothiazole alkyl quaternary salt, except the iodides, with one molecular proportion of an ortho ester of an aliphatic monobasic carboxylic acid in the presence of pyridine.

9. A process for the preparation of cyanine dyes which comprises condensing two molecular proportions of a 2-methyl-beta-naphthothiazole alkyl quaternary salt, except the iodides, with one molecular proportion of ethyl-ortho-acetate in the presence of pyridine.

10. A process for the preparation of cyanine dyes which comprises condensing two molecular proportions of 2-methyl-beta-naphthothiazole etho-p-toluene sulfonate with one molecular proportion of ethyl-ortho-acetate in the presence of an organic base which is a solvent for the reactants and which acts to bind acid eliminated from the quaternary salt as a result of the condensation.

11. A process for the preparation of cyanine dyes which comprises condensing two molecular proportions of 2-methyl-beta-naphthothiazole etho-p-toluene sulfonate with one molecular proportion of ethyl-ortho-acetate in the presence of pyridine.

12. A process for the preparation of cyanine dyes which comprises condensing two molecular proportions of 2-methyl-beta-naphthothiazole metho-p-toluene sulfonate with one molecular proportion of ethyl-ortho-acetate in the presence of an organic base which is a solvent for the reactants and which acts to bind acid eliminated from the quaternary salt as a result of the condensation.

13. A process for the preparation of cyanine dyes which comprises condensing two molecular proportions of 2-methyl-beta-naphthothiazole metho-p-toluene sulfonate with one molecular proportion of ethyl-ortho-acetate in the presence of pyridine.

14. A 2.2'-dialkyldibenzothiocarbocyanine salt.

15. A 2.2'-dialkyl-3.4.3'.4'-dibenzothiocarbocyanine salt.

16. A 2.2'-dimethyldibenzothiocarbocyanine salt.

17. A 2.2'-diethyldibenzothiocarbocyanine salt.

18. A 2.2'-dialkyl-8-alkyldibenzothiocarbocyanine salt in which the 8-alkyl-group contains more than one carbon atom.

19. A 2.2'-dialkyl-8-alkyl-3.4.3'.4'-dibenzothiocarbocyanine salt.

20. A 2.2'-dimethyl-8-alkyl-3.4.3'.4' - dibenzothiocarbocyanine salt.

21. A 2.2'-diethyl-8-alkyl-3.4.3'.4'-dibenzothiocarbocyanine salt.

22. A 2.2'-dialkyl-8-methyl - 3.4.3'.4'-dibenzothiocarbocyanine salt.

23. A 2.2'.8-trimethyl-3.4.3'.4'-dibenzothiocarbocyanine salt.

24. A 2.2'-diethyl-8-methyl-3.4.3'.4' - dibenzothiocarbocyanine salt.

25. A 2.2'.8-triethyl-3.4.3'.4'-dibenzothiocarbocyanine salt.

LESLIE G. S. BROOKER.